US011065482B2

(12) United States Patent
Cooper et al.

(10) Patent No.: US 11,065,482 B2
(45) Date of Patent: *Jul. 20, 2021

(54) TIP RESISTANT SYSTEM WITH QUICK DISCONNECT

(71) Applicant: Government of the United States, as represented by the Secretary of the Air Force, Wright-Patterson AFB, OH (US)

(72) Inventors: Cory Cooper, Monument, CO (US); Darren Craig Tidwell, Huntsville, UT (US); Garrett Fritzsche, Monument, CO (US); Christopher Yooshin Jang, Colorado Springs, CO (US); Brock M. Flieger, Colorado Springs, CO (US); Alan James Vaillencourt, Jr., Cookeville, TN (US); Miranda Leigh Bray, Colorado Springs, CO (US); Shane Michael Riley, Sheppard AFB, TX (US); Nathanael J. Szuch, SAFB, TX (US); Philip T. Strunk, USAF Academy, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 198 days.

This patent is subject to a terminal disclaimer.

(21) Appl. No.: 15/498,518

(22) Filed: Apr. 27, 2017

(65) Prior Publication Data

US 2018/0311518 A1 Nov. 1, 2018

(51) Int. Cl.
*A62B 35/00* (2006.01)
*F16B 45/06* (2006.01)
(Continued)

(52) U.S. Cl.
CPC ............ *A62B 35/0037* (2013.01); *A62B 1/18* (2013.01); *A62B 35/0075* (2013.01);
(Continued)

(58) Field of Classification Search
CPC ... A62B 35/0037; A62B 35/0075; A62B 1/18; A62B 29/02; F16B 45/06
See application file for complete search history.

(56) References Cited

U.S. PATENT DOCUMENTS

| 31,946 A | 4/1861 | Beagle, Jr. |
| 57,456 A | 8/1866 | Alyson |

(Continued)

FOREIGN PATENT DOCUMENTS

| CA | 2415874 | 7/2004 | |
| CA | 2748406 A1 * | 12/2010 | ......... A62B 35/0075 |

(Continued)

OTHER PUBLICATIONS

DE3347725 machine translation.
DE3037766 machine translation.
CN100343154 machine translation.

*Primary Examiner* — Colleen M Chavchavadze
*Assistant Examiner* — Candace L Bradford
(74) *Attorney, Agent, or Firm* — AFMCLO/JAZ; Timothy M. Barlow

(57) ABSTRACT

A tip resistant system for use with a belay tether includes a user tether having a first length and configured to be connectable between a user and the belay tether. The user tether has a belay tether connector adjacent one end of the user tether, and a user connector adjacent an opposite end of the user tether. An auxiliary tether having a second length less than the first length of the user tether and configured to be connectable between the user and the user tether includes a user tether connector located adjacent a first end of the auxiliary tether, and an auxiliary user connector located (Continued)

adjacent a second end of the auxiliary tether opposite the user tether connector. The tip resistant system operates to maintain a user in a desired static attitude. A quick disconnect for use with a belay tether is also provided.

14 Claims, 9 Drawing Sheets

(51) Int. Cl.
 *A62B 1/18* (2006.01)
 *A63B 29/02* (2006.01)
 *F16B 45/02* (2006.01)

(52) U.S. Cl.
 CPC .............. *F16B 45/06* (2013.01); *A63B 29/02* (2013.01); *F16B 45/02* (2013.01)

(56) References Cited

U.S. PATENT DOCUMENTS

| | | | |
|---|---|---|---|
| 184,211 A | 11/1876 | Jones | |
| 217,942 A | 7/1879 | Hayden | |
| 340,558 A | 4/1886 | Converse | |
| 346,811 A | 8/1886 | Drew | |
| 550,189 A | 11/1895 | Melka | |
| 641,316 A | 1/1900 | Meyer | |
| 682,684 A | 9/1901 | Hakemeyer | |
| 755,841 A | 3/1904 | Brady | |
| 1,041,399 A | 10/1912 | Adams | |
| 1,392,184 A | 9/1921 | Long | |
| 2,674,773 A | 4/1954 | Lundholm | |
| 3,757,893 A * | 9/1973 | Hobbs | A62B 35/0025 182/6 |
| 3,841,666 A | 10/1974 | Gaylord | |
| 4,722,495 A | 2/1988 | Meredith | |
| 5,005,266 A | 4/1991 | Fister et al. | |
| 5,107,956 A * | 4/1992 | Constantinis | A62B 1/06 182/5 |
| 5,360,083 A | 11/1994 | Hede | |
| 5,487,444 A * | 1/1996 | Dennington | A62B 35/04 182/6 |
| 6,164,048 A * | 12/2000 | Rhodes | A01K 27/005 24/115 F |
| 6,299,040 B1 * | 10/2001 | Matias | A45F 5/00 224/254 |
| 6,698,544 B2 * | 3/2004 | Kurtgis | A62B 35/0075 182/145 |
| 9,242,736 B2 | 1/2016 | Fitzgerald | |
| 9,943,710 B1 * | 4/2018 | Cooper | F16B 45/06 |
| 10,207,130 B2 * | 2/2019 | Cooper | A62B 35/0075 |
| 2009/0071750 A1 * | 3/2009 | Simard | A62B 35/0075 182/5 |
| 2009/0236177 A1 * | 9/2009 | Maurice | A63B 29/02 182/6 |
| 2016/0107007 A1 * | 4/2016 | Pollard | A62B 35/0075 182/3 |
| 2017/0036046 A1 * | 2/2017 | Boraas | A62B 35/0075 |
| 2019/0022430 A1 * | 1/2019 | Denike | A62B 1/06 |

FOREIGN PATENT DOCUMENTS

| | | | |
|---|---|---|---|
| CN | 100343154 | 10/2007 | |
| DE | 3037766 | 10/1980 | |
| DE | 3347725 | 12/1983 | |
| WO | 20140088603 | 6/2014 | |
| WO | WO-2018150299 A1 * | 8/2018 | ......... A62B 35/0043 |

* cited by examiner

TIP RESISTANT SYSTEM WITH QUICK DISCONNECT

GOVERNMENT INTEREST

The invention described herein may be manufactured and used by or for the Government of the United States for all governmental purposes without the payment of any royalty.

CROSS REFERENCE TO RELATED APPLICATIONS

Pursuant to 37 C.F.R. § 1.78(d)(1), this application claims the benefit of and priority to prior filed co-pending Non-Provisional application Ser. No. 15/487,833, filed 14 Apr. 2017; co-pending Non-Provisional Ser. No. 15/489,116, filed 17 Apr. 2017; and co-pending Non-Provisional Ser. No. 15/494,699, filed 24 Apr. 2017, which are expressly incorporated herein by reference.

FIELD OF THE INVENTION

This invention relates to the field of tethered support systems. More particularly, this invention relates to a tip resistant system configured to maintain a tethered user in a desired static attitude, and having a quick disconnect feature for enabling release from a belay tether with limited engagement by the user, such as by using only one hand.

BACKGROUND OF THE INVENTION

Improvement is desired in the construction of devices used to connect between a harness worn about the body of a user and a belay tether used for descending users from elevated locations or ascending users to elevated locations. Improvement of such devices is desired for use in the sport of rock climbing, as well as for use in first responder and military environments. In each case, the user wears a body harness and a device is utilized to connect between the body harness and the belay tether.

FIG. 1 shows a prior art harness connector HC that connects between a belay tether BT of a belay device BD, and a body harness BH worn by a user U. Conventionally, the user U grasps the belay tether BT with one or both hands to balance and resist tipping backwards to remain in a generally upright attitude during descent (or ascent) and upon landing. This can become difficult in certain environments, and especially when the user has a backpack BP or other equipment, such as body armor, tools, or like equipment carried by the user.

FIG. 1 depicts problems associated with conventional devices, characterized by the user U tipping backwards and being unable to maintain a desired upright attitude, especially when wearing the backpack BP or other equipment. In addition, it can be difficult for the user to detach from the belay tether BT when landing. FIG. 1 shows a conventional snap ring SR used to connect between the harness connector HC and the belay tether BT. The snap ring SR and similarly configured fastener devices are difficult to operate, especially when the user has only one hand to operate the device, is attempting to operate the device in an urgent situation, or is operating in an environment characterized by a variety of difficult conditions.

What is needed, therefore, is a tip resistant system that operates to maintain a user in a desired static attitude, and having a quick disconnect feature that enables the user to quickly disconnect from the belay tether with limited engagement by the user, such as through the use of one hand, as may be required in a variety of situations and conditions.

SUMMARY OF THE INVENTION

The above and other needs are met by improved belay devices, including a tip resistant system having a quick disconnect feature for use with a belay tether.

According to a first embodiment of the invention, a tip resistant system is presented for use with a belay tether. The tip resistant system includes a user tether having a first length and configured to be connectable between a user and the belay tether. The user tether has a belay tether connector adjacent one end of the user tether, and a user connector adjacent an opposite end of the user tether. The tip resistant system also includes an auxiliary tether having a second length less than the first length of the user tether and configured to be connectable between the user and the user tether. The auxiliary tether includes a user tether connector located adjacent a first end of the auxiliary tether, and an auxiliary user connector located adjacent a second end of the auxiliary tether opposite the user tether connector. During use of the tip resistant system by the user, the tip resistant system operates to maintain a user in a desired static attitude.

According to another embodiment of the invention, the invention provides a quick disconnect for use with a belay tether, an integral connector non-removably connected to the user tether, and a mechanical disconnect operably associated with the removable connector and integral connector. The quick disconnect includes a user tether and a quick disconnect configured to releasably connect the user tether to the belay tether.

According to a further embodiment of the invention, the quick disconnect includes a pair of cooperating rings integrally connected to the user tether, one of the cooperating rings being smaller than the other and passable therethrough. The quick disconnect also includes a cord associated with the cooperating rings, a lock member fixedly coupled to the user tether, a handle removably couplable to the lock member, and a cable fixed to the handle and releasably connectable to the cord.

According to another embodiment of the invention, the tip resistant system includes a user tether having a first length and configured to be connectable between a body harness worn by a user and the belay tether, a belay tether connector adjacent one end of the user tether, and a body harness connector adjacent an opposite end of the user tether.

According to a further embodiment of the invention, the tip resistant system includes an equipment tether having a second length less than the first length of the user tether and configured to be connectable between equipment worn by the user about an upper body portion of the user and the user tether. The equipment tether includes a user tether connector located adjacent a first end of the equipment tether and configured for connecting the first end of the equipment tether to the user tether, and an equipment connector located adjacent a second end of the equipment tether opposite the user tether connector and configured to releasably connect the equipment tether to the equipment.

According to another embodiment of the invention, the user connector of the user tether is configured to be connectable to a body harness worn by the user.

According to a further embodiment of the invention, the auxiliary user connector of the auxiliary tether is configured to be connectable to equipment worn about an upper body portion of the user.

According to another embodiment of the invention, the user tether has a length of from about 15 inches to about 50 inches.

According to a further embodiment of the invention, the auxiliary tether has a length of from about 5 inches to about 35 inches.

According to another embodiment of the invention, the ratio of the length of the user tether to the length of the auxiliary tether ranges from about 1.4 to about 3.0.

According to a further embodiment of the invention, the desired static attitude comprises an attitude wherein a head portion of the user is maintained at an upright location adjacent the belay tether connector.

According to another embodiment of the invention, the user tether includes an elastic member to apply a compacting tension to compact the length of the user tether.

According to a further embodiment of the invention, a quick disconnect for use with a belay tether comprises a user tether and a quick disconnect configured to releasably connect the user tether to the belay tether, the quick disconnect comprising a pair of cooperating rings integrally connected to the user tether, one of the cooperating rings being smaller than the other and passable therethrough, a cord associated with the cooperating rings, a lock member fixedly coupled to the user tether, a handle removably couplable to the lock member, and a cable fixed to the handle and releasably connectable to the cord.

According to another embodiment of the invention, the quick disconnect further comprises a large ring connected to the belay tether, the pair of cooperating rings each being smaller in diameter than the large ring and passable therethrough.

According to a further embodiment of the invention, the handle includes a spring-loaded collar and lock bearings, and the lock member comprises a cylinder having a circumferential indent that cooperates with the lock bearings and the spring-loaded collar to releasably lock the handle to the lock member.

According to another embodiment of the invention, a tip resistant system for use with a belay tether comprises a user tether having a first length and configured to be connectable between a body harness worn by a user and the belay tether, the user tether including: a belay tether connector adjacent one end of the user tether, and a body harness connector adjacent an opposite end of the user tether; and an equipment tether having a second length less than the first length of the user tether and configured to be connectable between equipment worn by the user about an upper body portion of the user and the user tether, the equipment tether including: a user tether connector located adjacent a first end of the equipment tether and configured for connecting the first end of the equipment tether to the user tether, and an equipment connector located adjacent a second end of the equipment tether opposite the user tether connector and configured to releasably connect the equipment tether to the equipment.

According to a further embodiment of the invention, the belay tether connector comprises a removable connector separable from the user tether, an integral connector non-removably connected to the user tether, and a mechanical disconnect operably associated with the removable connector and the integral connector.

According to another embodiment of the invention, the removable connector comprises a belay tether ring, the integral connector comprises a pair of cooperating rings each smaller than the belay tether ring and integrally connected to the user tether, one of the pair of cooperating rings being smaller than the other and passable therethrough, and the mechanical disconnect comprises a cord associated with the pair of cooperating rings, a lock member fixedly coupled to the user tether, a handle removably couplable to the lock member, and a cable fixed to the handle and releasably connectable to the cord.

According to a further embodiment of the invention, the user tether has a length of from about 15 inches to about 50 inches.

According to another embodiment of the invention, the equipment tether has a length of from about 5 inches to about 35 inches.

According to a further embodiment of the invention, the ratio of the length of the user tether to the length of the equipment tether ranges from about 1.4 to about 3.0.

According to another embodiment of the invention, the user tether includes an elastic member to apply a compacting tension to compact the user tether.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION OF THE INVENTION

Figure 1:
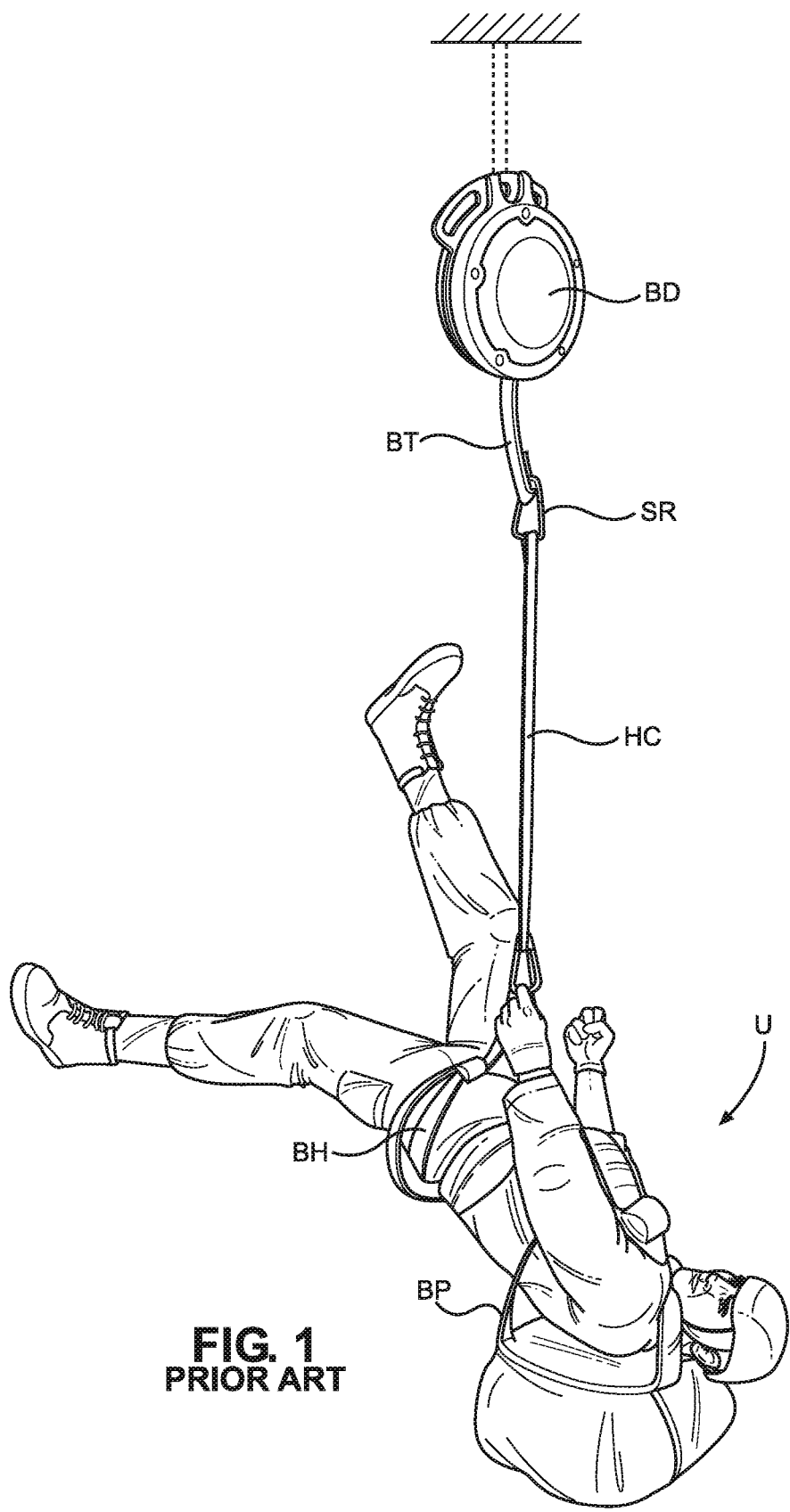
FIG. 1 depicts prior art devices for connecting between a user and a belay tether.
Figure 2:
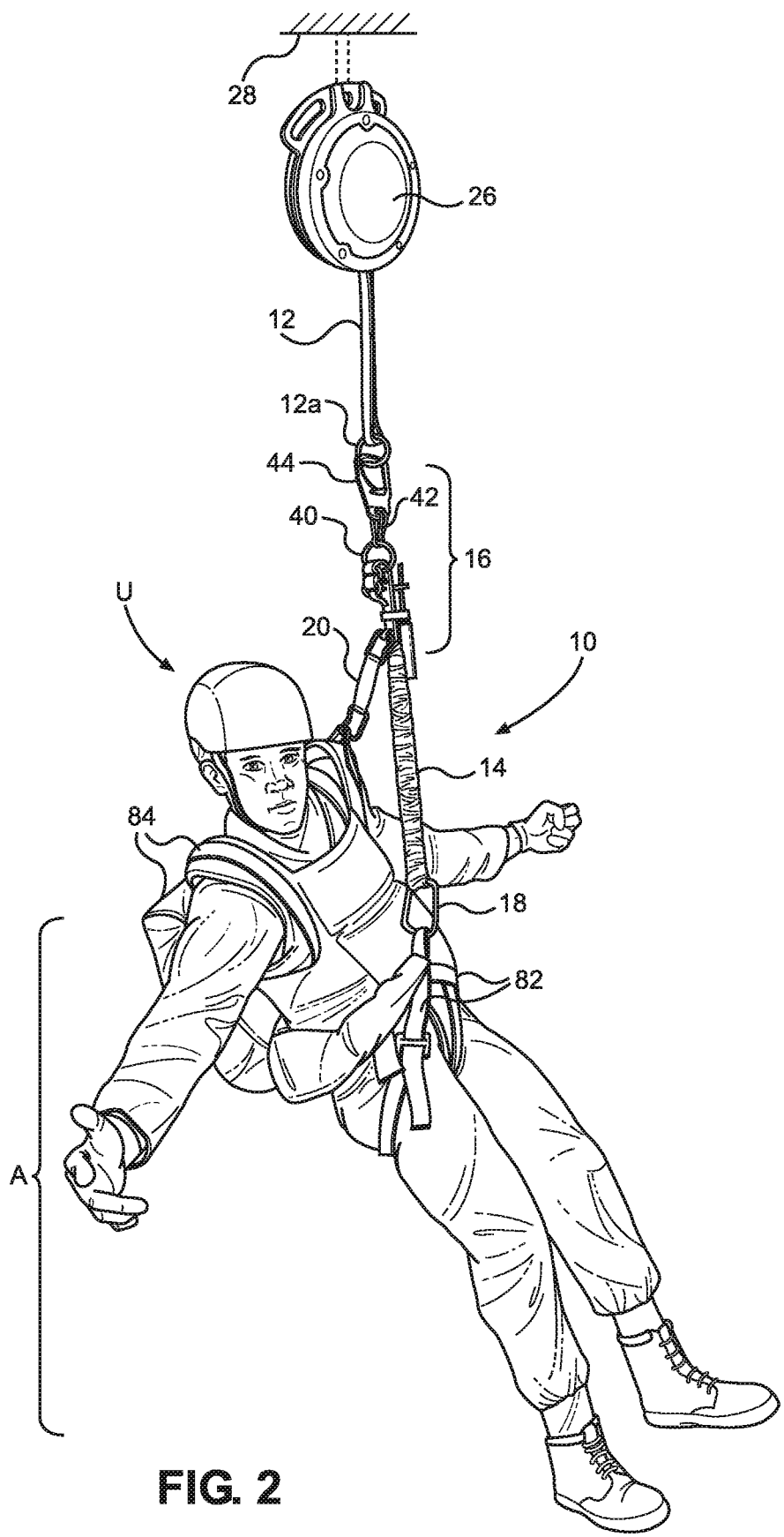
FIG. 2 illustrates a tip resistant system according to the invention.

With reference to FIGS. 2-8D, there is shown a tip resistant system 10 according to the invention for use with a belay tether 12. During use of the tip resistant system 10 by a user U, the tip resistant system 10 serves to maintain the user U in a desired static attitude A, characterized by the user U being maintained in a generally upright attitude, as depicted in FIG. 2. The tip resistant system 10 is configured to be suitable for a variety of environments, such as those environments likely to be encountered by persons engaged in military, first responder, or recreational activities.

Figure 3:
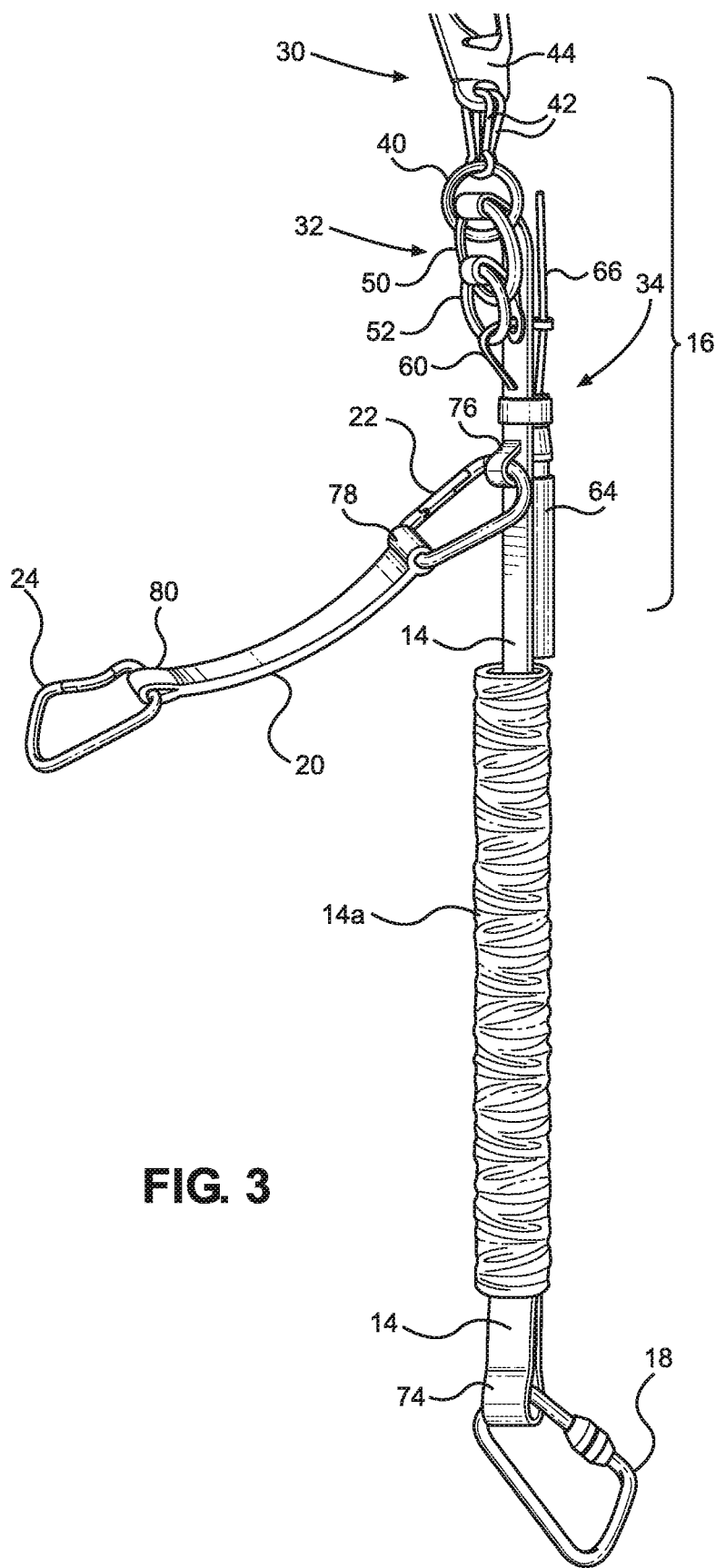
FIG. 3 depicts a close-up view of the tip resistant system of FIG. 2.
Figure 4:
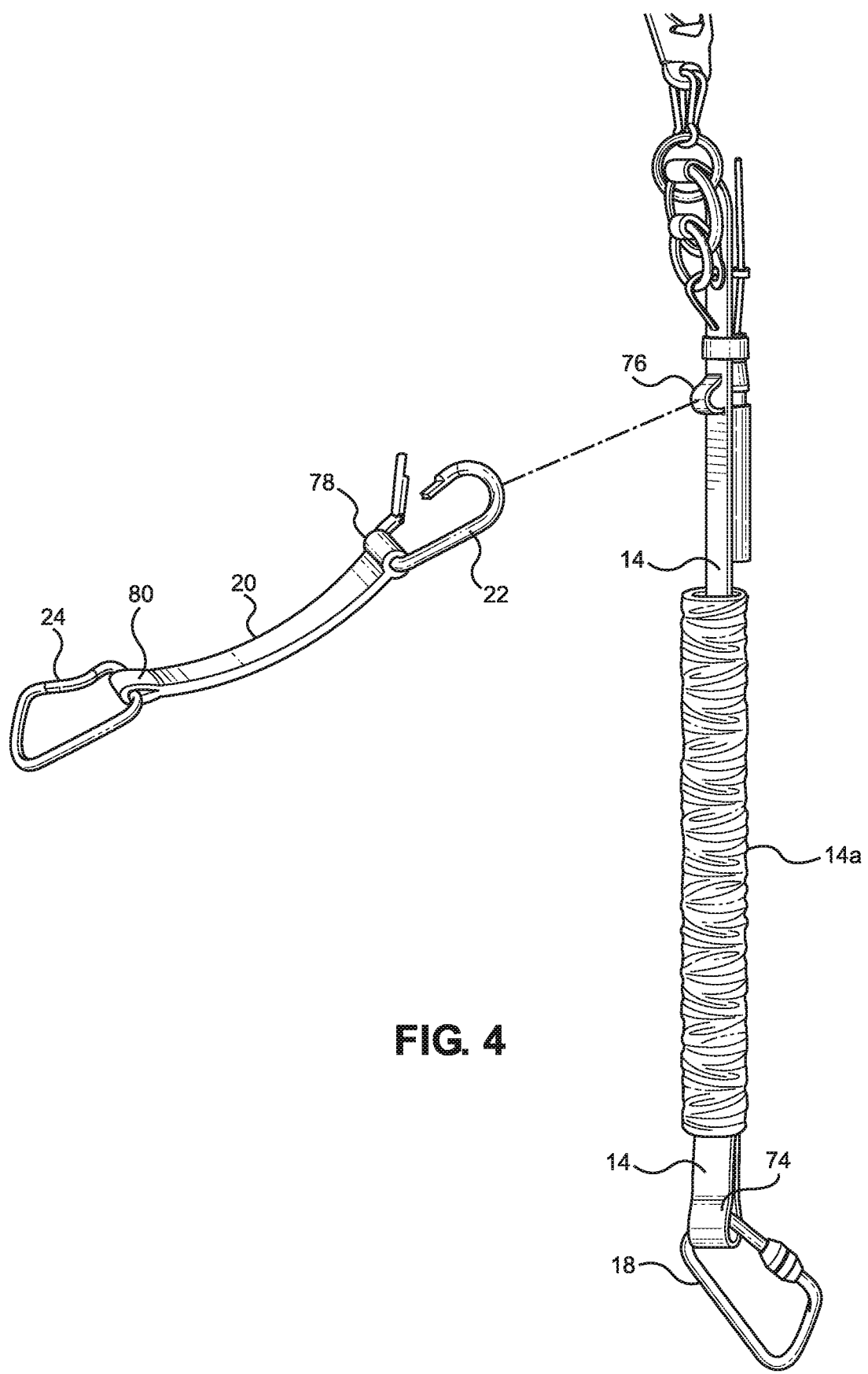
FIG. 4 depicts a partially exploded view of FIG. 3.

As seen in FIGS. 2, 3, and 4, the tip resistant system 10 includes a user tether 14 configured to be connectable between the user U and the belay tether 12. The user tether 14 has a belay tether connector 16 adjacent one end of the user tether 14, and a user connector 18 adjacent an opposite end of the user tether 14. The tip resistant system 10 also includes an auxiliary tether 20 configured to be connectable between the user U and the user tether 14. The auxiliary tether 20 has a user tether connector 22 configured for connecting one end of the auxiliary tether 20 to the user tether 14, and an auxiliary user connector 24 located adjacent an end of the auxiliary tether 20 opposite the user tether connector 22.

The belay tether 12 may be a conventional belay tether, such as a rope, strap or cable. Desirably, the belay tether 12 includes a loop or a ring 12a at the end thereof for interfacing with the belay tether connector 16. Typically, the belay tether 12 is associated with an automatic belay device 26, which connects to an elevated support 28.

Figure 5:
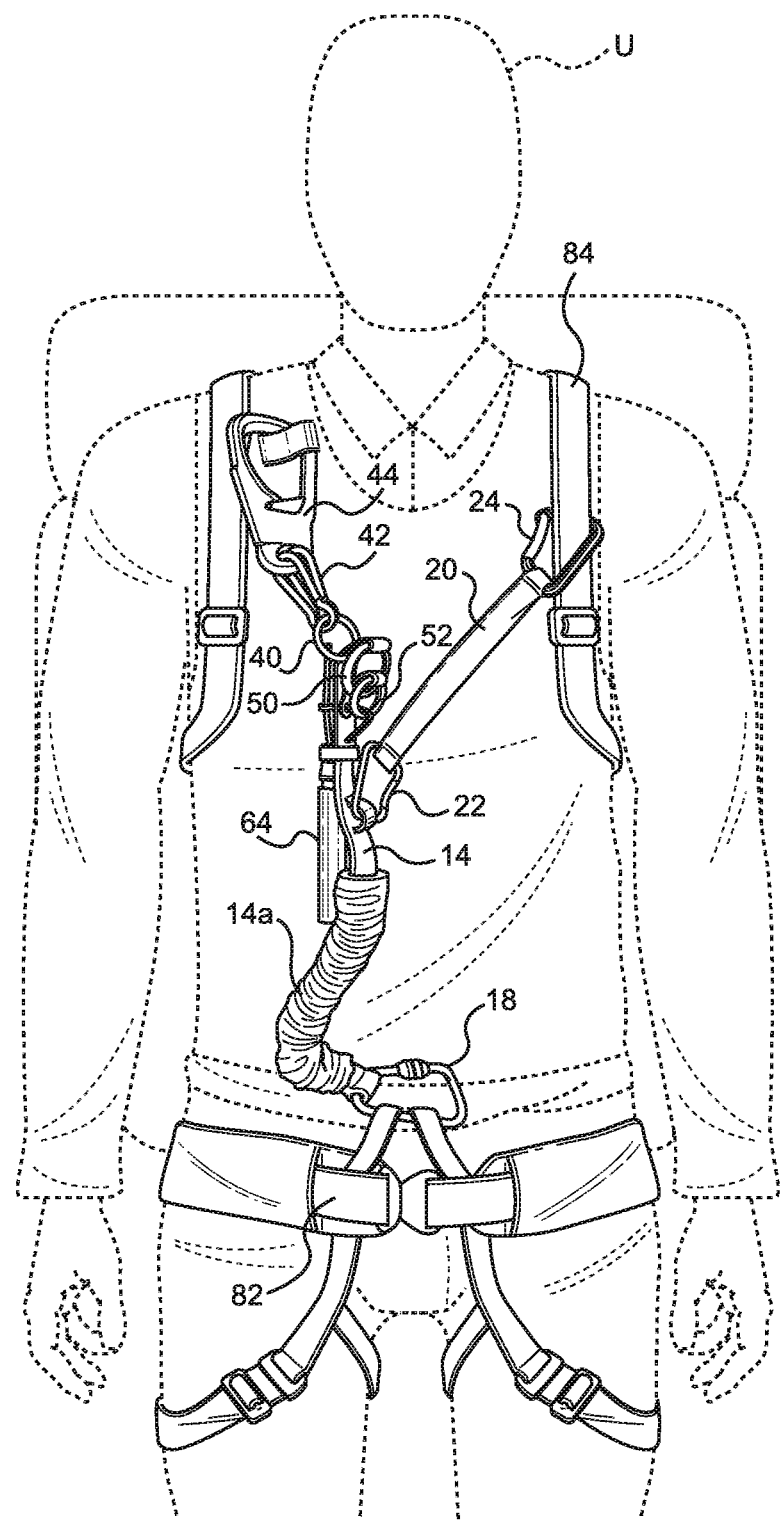
FIG. 5 illustrates a user wearing the tip resistant system of FIG. 2 as configured prior to connection to a belay tether.
Figure 6:
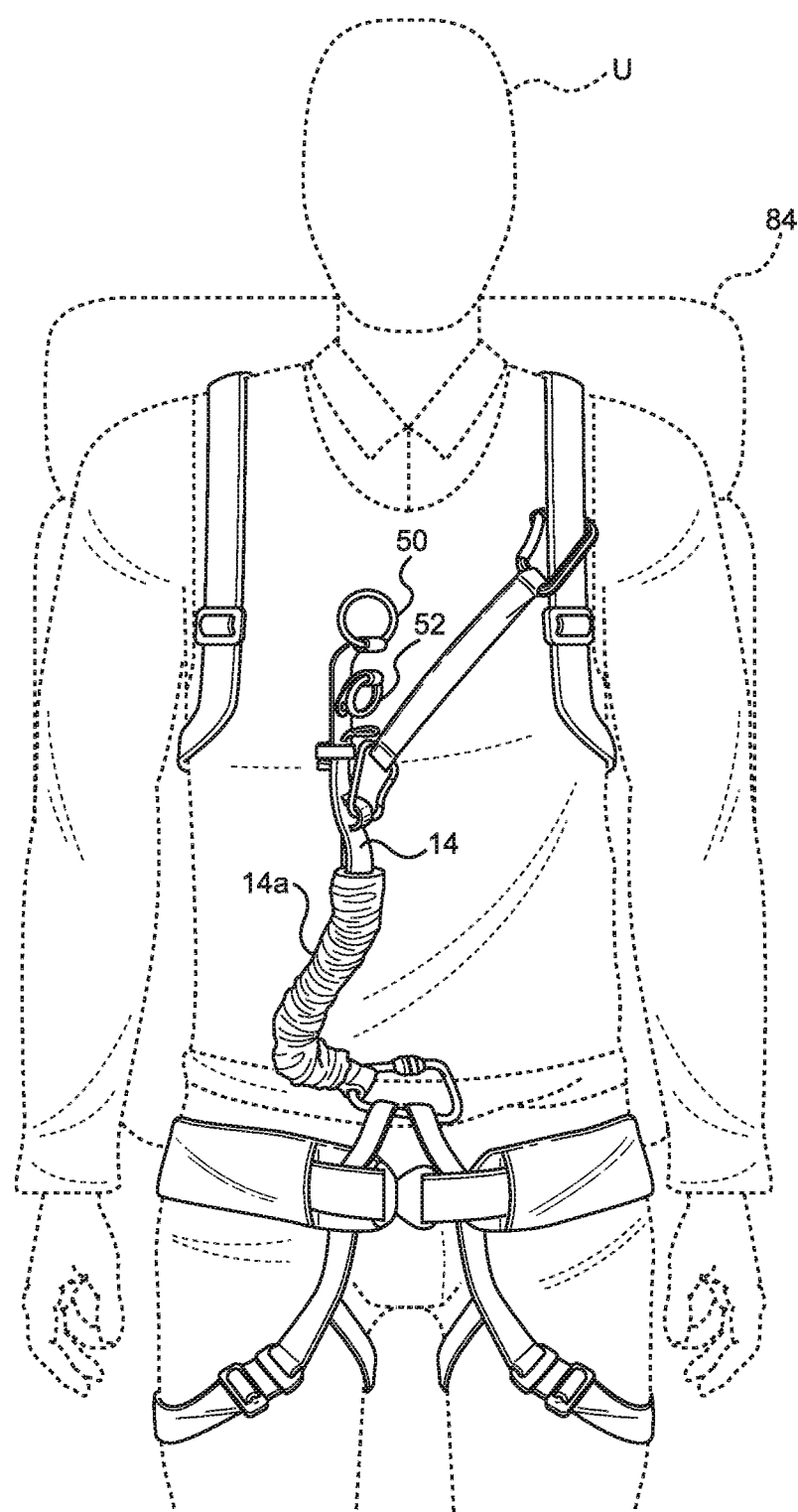
FIG. 6 illustrates a user wearing the tip resistant system of FIG. 2 as configured immediately after disconnection from a belay tether.

The user tether 14 preferably has a length of from about 15 inches to about 50 inches to fit the majority of users. The user tether 14 may be made of any sufficiently strong tether material, but is preferably made of nylon strap material. An elastic member 14a is preferably connected to the user tether 14 to gather and compact the length of the user tether 14 when it is not tensioned, the compaction of the user tether 14 by the elastic member 14a facilitates storage of the tether 14 against the user U when the tip resistant system 10 is not connected to the belay tether 12, such as seen in FIGS. 5 and 6.

The belay tether connector 16 includes a removable connector 30 separable from the user tether 14, an integral connector 32 non-removably connected to the user tether 14, and a mechanical disconnect 34 operably associated with the removable connector 30 and the integral connector 32. Together, the integral connector 32 and the mechanical disconnect 34 as configured herein provide a desirable quick disconnect feature of the tip resistant system 10.

As described herein, integral connector 32 and the mechanical disconnect 34 of the belay tether connector 16 are configured to provide a quick disconnect feature that enables quick and easy connection to the belay tether 12 and also enables quick and easy disconnection from the belay tether 12. The quick disconnect feature is particularly desirable to enable the user U to quickly disconnect when using the invention in difficult conditions and environments. The quick disconnect feature enables the user U to disconnect from the belay tether 12 with limited engagement from the user, such as requiring the use of only one hand to accomplish disconnect.

Figure 8A:
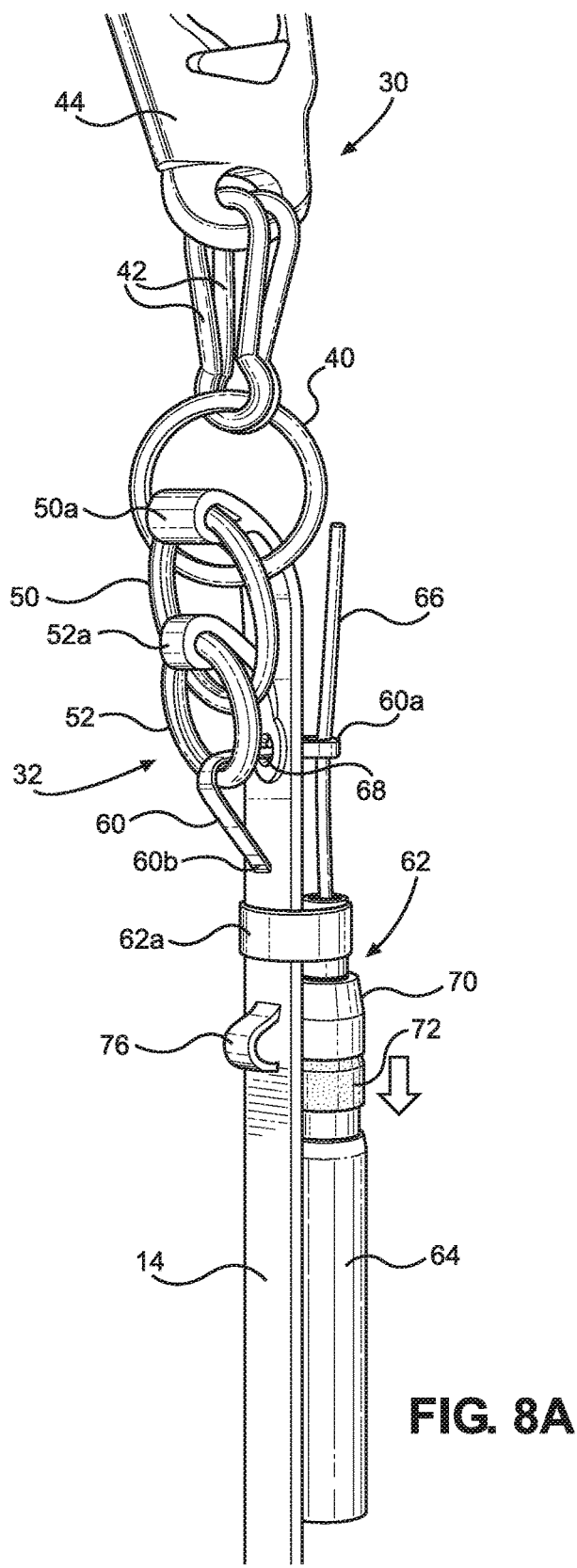
FIGS. 8A-8D illustrate operation of a quick disconnect of the tip resistant system.

With reference to FIGS. 2, 3 and 8A, the removable connector 30 facilitates quick connection to the ring 12a of the belay tether 12 and includes a belay tether ring 40. The belay tether ring 40 is preferably coupled as by snap loops 42 to a quick release carabiner or snap hook 44 that can snap to the ring 12a of the belay tether 12.

The integral connector 32 as shown in FIG. 3, includes a pair of cooperating rings 50 and 52, as shown in detail in FIGS. 8A-8D. Each of the cooperating rings 50 and 52 is smaller in diameter than the belay tether ring 40 and is integrally connected to the user tether 14. The ring 52 is smaller than the ring 50 so as to be able to pass therethrough. The ring 50 is integrally connected to the end of the user tether 14 by a loop 50a. The ring 52 is integrally connected to the user tether 14 just below the ring 52 by a loop 52a.

The mechanical disconnect 34 includes a cord 60 operably associated with the cooperating rings 50 and 52, a lock member 62 fixedly coupled to the user tether 14 as by a band 62a, a handle 64 removably couplable to the lock member 62, and a relatively rigid cable 66 having one end fixed to the handle 64 and the opposite free end extending upwardly and positioned to be releasably connectable to the cord 60.

The cord 60 has a free end defining a loop 60a and an opposite end 60b affixed to the user tether 14. The loop 60a passes through an aperture 68 defined through the user tether 14. The handle 64 may be of molded plastic construction with the cable 66 being a nylon cord attached to the handle 64 during molding of the handle 64. As described more fully below, the loop 60a of the cord 60 is passed through the aperture 68 of the user tether 14. The cable 66 of the handle 64 extends through and past the loop 60a to prevent the loop 60a from passing back through the aperture 68. Once the handle 64 is pulled by the user to activate the quick disconnect feature, the cable 66 travels downward with the handle 64 to withdraw the cable 66 from the loop 60a.

In a preferred embodiment, the handle 64 includes a spring-loaded collar 70 and lock bearings shown in phantom as represented by reference numeral 70a (FIG. 8C) and located within the inner circumference of the collar 70. For this handle configuration, the lock member 62 may be provided as by a cylinder 72 having a circumferential indent 72a (FIG. 8C) that cooperates with the lock bearings 70a and the spring-loaded collar 70 to releasably lock the handle 64 to the lock member 62.

The user connector 18 may be provided as by a locking carabiner or like structure. The user connector 18 may be connected to the user tether 14 as by a loop 74 sewn or otherwise formed on the user tether 14 (FIG. 4).

The auxiliary tether 20 may be made of any sufficiently strong tether material, but is preferably made of nylon strap material. The auxiliary tether 20 has a length less than the length of the user tether 14, and preferably from about 5 inches to about 35 inches. Thus, the ratio of the length of the user tether to the length of the equipment tether preferably ranges from about 1.4 to about 3.0.

The user tether connector 22 may be provided as by a quick release carabiner or like structure. The user tether connector 22 may be connected to the user tether 14 as by a loop 76 formed on the user tether 14 adjacent the belay tether connector 16. In this regard, a loop 78 or the like receiving structure is desirably formed on the auxiliary tether 20.

The auxiliary user connector 24 may each be provided as by a quick release carabiner or like structure. The auxiliary user connector 24 may be connected to the auxiliary tether 20 as by a loop 80 formed on the auxiliary tether 20.

Figure 7C:
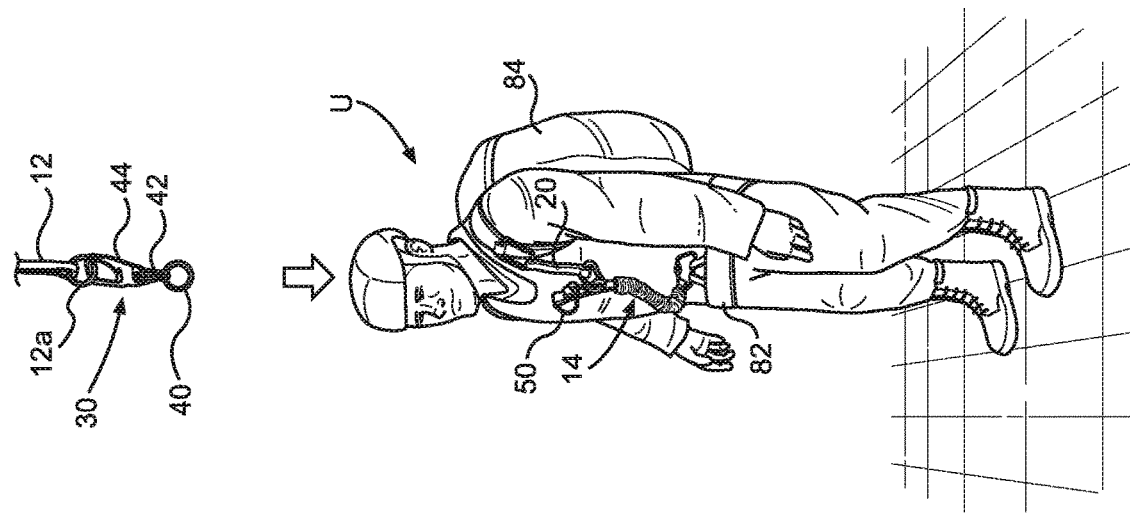
FIGS. 7A-7C depict the descent and landing of a user and disconnection of the user from a belay tether.
Figure 7B:
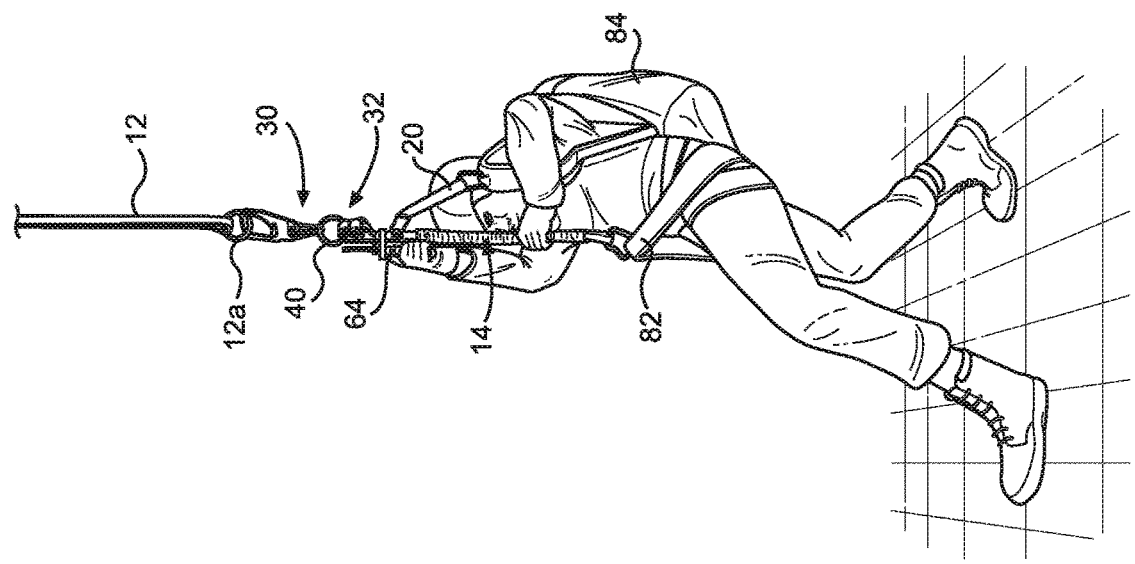
Figure 7A:
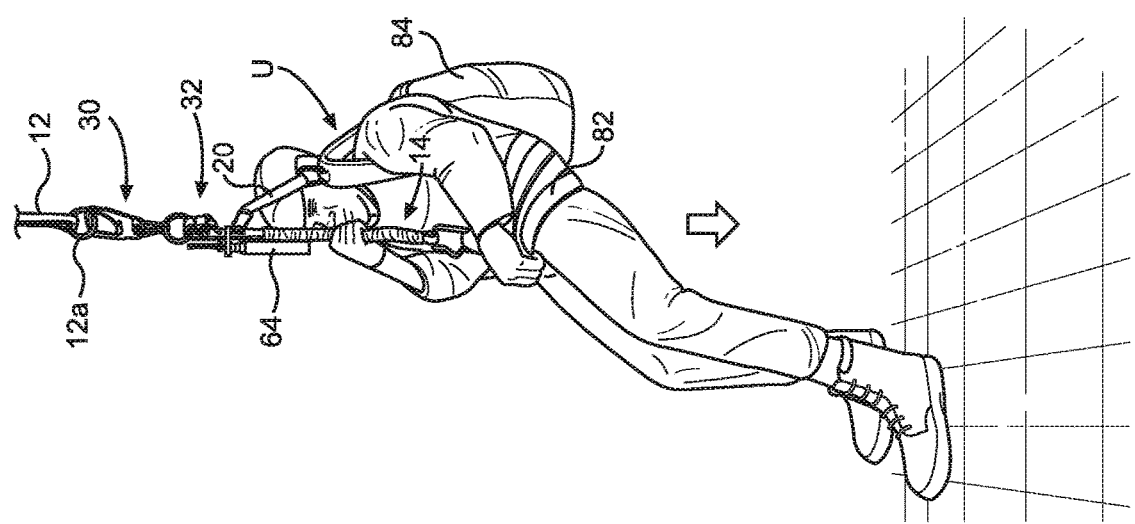

FIG. 2 and corresponding FIG. 7A each show the user U suspended from the belay tether 12, with the tip resistant system 10 maintaining the user U in the desired static attitude A, characterized by the user U being maintained in a generally upright attitude. The user U is preferably wearing a body harness 82 and may be wearing or carrying equipment 84 about an upper body portion of the user. The body harness 82 may be of a variety of conventional harness, such as waist harnesses, hip harnesses, and the like. The equipment 84 may be a backpack, body armor, tools, weaponry, or a variety of other equipment a user may carry or wear depending on the activity in which the user U is engaged.

In the illustrated embodiment, the user tether 14 connects to the body harness 82 via the user connector 18, and the auxiliary tether 20 connects to the equipment 84, such as the strap of a backpack or other equipment, via auxiliary user connector 24. Absent the presence of auxiliary tether 20 connected between the user tether 14 and the equipment 84, the user U would not be able to maintain the upright attitude without the use of one or both hands and considerable effort. As depicted in FIG. 2, the use of the tip resistant system 10 having the auxiliary tether 20 serves to maintain the user U in the desired attitude without the use of any hands.

FIG. 5 shows the user U outfitted with the tip resistant system 10 prior to connection to the belay tether 12. As configured, the tip resistant system 10 may be worn by the user U in advance of connection to the belay tether 12, and is configured to permit quick and easy connection to the belay tether 12. For example, the user U may install the tip resistant system 10 by attaching the user connector 18 to the body harness 82, and connecting the auxiliary user connector 24 to the equipment 84. If desired, and as shown in FIG. 5, the snap hook 44 may be attached to a loop on clothing of the user U or to the equipment 84 or the like to maintain the snap hook 44 in an easily accessible location, and to inhibit movement of the snap hook 44 when not connected to the belay tether 12. The elastic member 14a can be seen in FIG. 5 serving to compact the length of the untensioned user tether 14.

As outfitted in FIG. 5, the user U need only disconnect the snap hook 44 from its storage position and connect the snap hook 44 to the belay tether ring 40 to connect to the belay tether 12. The user U is then ready to be acted on by the belay tether 12 to raise or lower the user U.

FIG. 6 and corresponding FIG. 7C each illustrate the user U after disconnection from the belay tether 12. As will be observed, when the user U disconnects from the belay tether 12, the removable connector 30 remains with the belay tether 12. The removable connector 30 and the mechanical disconnect 34 may be reinstalled to render the tip resistant system 10 again ready for use.

Returning to FIGS. 7A-7C, the operation of the tip resistant system 10 during descent (or ascent) of the user U via the belay tether 12, landing, and disconnection from the belay tether 12 is represented. As seen in FIG. 7A, the tip resistant system 10 operates to maintain the user U in a desired upright attitude. The upright attitude of the user U facilitates stable foot and leg positioning of the user U as the user lands on the ground or other landing site and releases the removable connector 30 from the user tether 14 (FIG. 7B). FIG. 7C represents that the user U has landed and released from the belay tether 12, and has done so in a manner such that the user U has remained in a desired upright attitude for the duration of the belay, landing and release events. It has been observed that use of the tip resistant system 10 advantageously serves to reduce undesirable landing events, such as falling and landing otherwise than on the feet in an upright attitude.

With reference to FIGS. 8A-8D, operation of the quick disconnect features of the tip resistant system 10 are illustrated. As seen, the quick disconnect features enable the user to quickly disconnect from the belay tether 12 with limited engagement by the user U. In the illustrated embodiment, the user U can employ the use of only one hand to accomplish disconnect. All of the activities of FIGS. 8A-8D may be accomplished by the user utilizing only one hand.

Figure 8B:
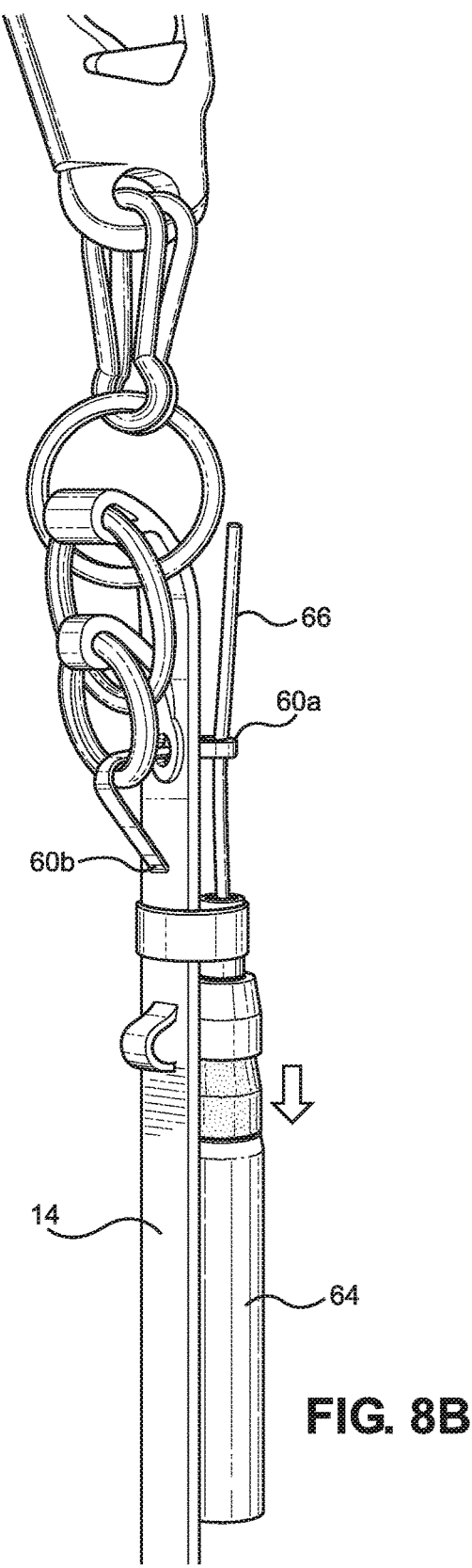

FIG. 8A corresponds to FIG. 7B, wherein the user U is activating the quick disconnect features of the tip resistant system 10. The arrow represents the user manipulating the spring-loaded collar 70 to free the lock bearings 70a from the indent 72a of the cylinder 72. Then, as seen in FIG. 8B, the user may pull down on the now unlocked handle 64, as represented by the arrow.

Figure 8C:
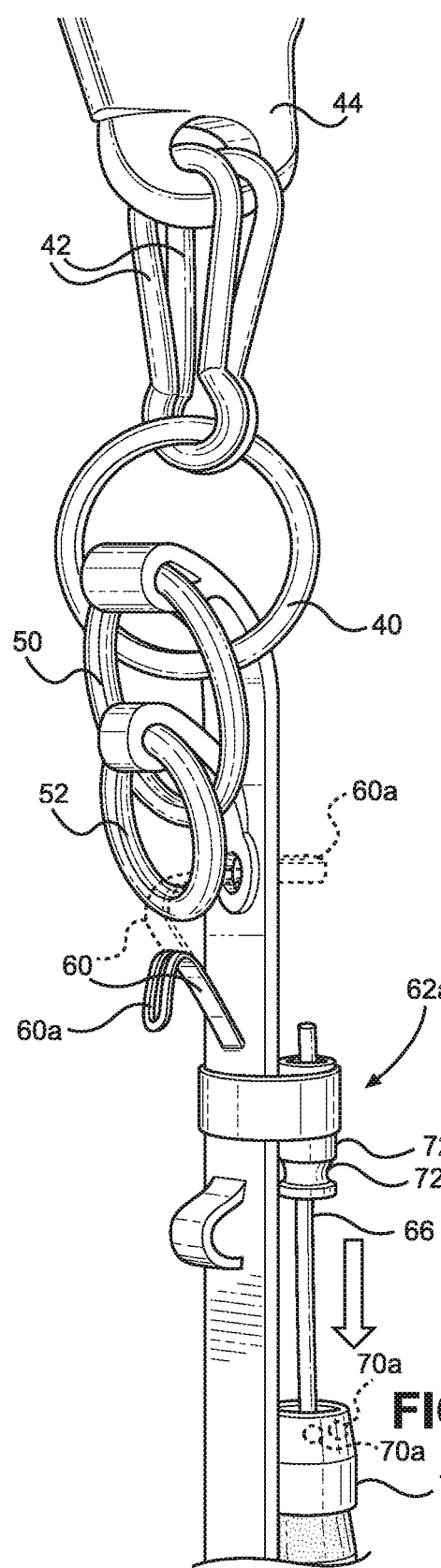
Figure 8D:
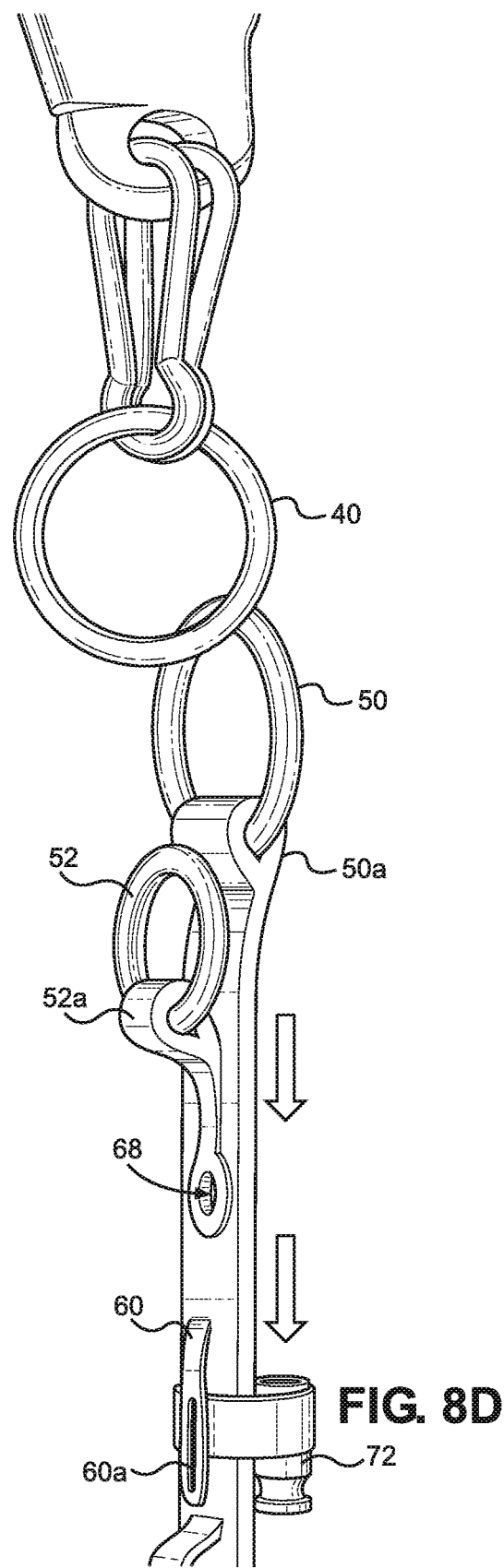

Moving to FIG. 8C, as the handle 64 is pulled down by the user, the cable 66 is disengaged from the cord 60, which enables the loop 60a to pass back through the aperture 68 of the user tether 14. As will be appreciated, the body weight of the user U and the weight of the equipment 84 exerts a downward force on the user tether 14. This downward force on the user tether 14 serves to pull the rings 50 and 52 downward, also enabling the loop 60a to pass back through the aperture 68 once the cable 66 is freed from the loop 60a. Once the loop 60a passes back through the aperture 68, the cord 60 disengages from the ring 52, freeing the ring 52. As a result of the ring 52 being freed, and as represented by FIG. 8D, the ring 52 can pass through the ring 50, which frees the ring 50 to pass through the ring 40 such that the user tether 14 is released from the belay tether 12. In this regard, it will be appreciated that the scenario shown in FIG. 7C immediately follows the disconnection activity of FIG. 8D.

Accordingly, it will be appreciated that the invention provides a tip resistant system that operates to maintain a user in a desired static attitude, and having quick disconnect features that enable the user to quickly disconnect from the belay tether using only one hand and in difficult conditions.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A tip resistant system for use with a belay tether, the tip resistant system consisting of:
   a user tether having a first length and configured to be connectable between one of a waist harness and a hip harness and the belay tether, the user tether having a belay tether connector adjacent one end of the user tether, and a user connector adjacent an opposite end of the user tether; and
   an auxiliary tether having a second length less than the first length of the user tether and configured to be removably fixed between equipment worn about an upper body portion of a user, and the user tether, wherein the worn equipment is one of a backpack and body armor, the auxiliary tether including:
   a user tether connector located adjacent a first end of the auxiliary tether, and
   an auxiliary user connector located adjacent a second end of the auxiliary tether opposite the user tether connector,
   wherein, during use of the tip resistant system by the user, the auxiliary tether operates to
   prevent tipping and to maintain the user in a desired static attitude.

2. The tip resistant system of claim 1, wherein the belay tether connector consists of a removable connector separable from the user tether, an integral connector non-removably connected to the user tether, and a mechanical disconnect operably associated with the removable connector and the integral connector.

3. The tip resistant system of claim 2, wherein the removable connector consists of a belay tether ring, the integral connector consists of a pair of cooperating rings each smaller than the belay tether ring and integrally connected to the user tether, one of the pair of cooperating rings being smaller than the other cooperating ring and passable therethrough, and the mechanical disconnect consists of a cord associated with the cooperating rings, a lock member fixedly coupled to the user tether, a handle removably couplable to the lock member, and a cable fixed to the handle and releasably connectable to the cord.

4. The tip resistant system of claim 1, wherein the user tether has a length of from about 15 inches to about 50 inches.

5. The tip resistant system of claim 1, wherein the auxiliary tether has a length of from about 5 inches to about 35 inches.

6. The tip resistant system of claim 1, wherein a ratio of the length of the user tether to the length of the auxiliary tether ranges from 1.4 to 3.0.

7. The tip resistant system of claim 1, wherein the user tether includes an elastic member to apply a compacting tension to compact the length of the user tether.

8. A tip resistant system for use with a belay tether, the tip resistant system consisting of:
   a user tether having a first length and configured to be connectable between a body harness worn by a user and the belay tether, the body harness consisting of one of a waist harness and a hip harness, the user tether including:
   a belay tether connector adjacent one end of the user tether, and
   a body harness connector adjacent an opposite end of the user tether; and
     an equipment tether having a second length less than the first length of the user tether and configured to be removably fixed between equipment worn by the user about an upper body portion of the user and the user tether, wherein the worn equipment is one of a backpack and body armor, the equipment tether including:
     a user tether connector located adjacent a first end of the equipment tether and configured for connecting the first end of the equipment tether to the user tether, and
     an equipment connector located adjacent a second end of the equipment tether opposite the user tether connector and configured to releasably connect the equipment tether to the equipment.

9. The tip resistant system of claim 8, wherein the belay tether connector consists of a removable connector separable from the user tether, an integral connector non-removably connected to the user tether, and a mechanical disconnect operably associated with the removable connector and the integral connector.

10. The tip resistant system of claim 9, wherein the removable connector consists of a belay tether ring, the integral connector consists of a pair of cooperating rings each smaller than the belay tether ring and integrally connected to the user tether, one of the pair of cooperating rings being smaller than the other and passable therethrough, and the mechanical disconnect consists of a cord associated with the pair of cooperating rings, a lock member fixedly coupled to the user tether, a handle removably couplable to the lock member, and a cable fixed to the handle and releasably connectable to the cord.

11. The tip resistant system of claim 8, wherein the user tether has a length of from about 15 inches to about 50 inches.

12. The tip resistant system of claim 8, wherein the equipment tether has a length of from about 5 inches to about 35 inches.

13. The tip resistant system of claim 8, wherein a ratio of the length of the user tether to the length of the equipment tether ranges from 1.4 to 3.0.

14. The tip resistant system of claim 8, wherein the user tether includes an elastic member to apply a compacting tension to compact the user tether.

* * * * *